United States Patent

Cutler

[11] 4,184,345
[45] Jan. 22, 1980

[54] COUPLING FOR DISCONNECTING A MOTOR DRIVE AND DRIVEN ACCESSORY

[75] Inventor: Jerome J. Cutler, Richboro, Pa.

[73] Assignees: Ernest J. Sims, Jr.; Nathan M. Goodman, custodian for Michelle B. and Michael W. Goodman; Milton Tottle; Howard Rosenbloom; Robert Mooney

[21] Appl. No.: 934,432

[22] Filed: Aug. 17, 1978

[51] Int. Cl.² .............................................. F16D 3/56
[52] U.S. Cl. ..................................................... 64/28 R
[58] Field of Search ........................................... 64/28

[56] References Cited

U.S. PATENT DOCUMENTS

| | | | |
|---|---|---|---|
| 1,414,207 | 4/1922 | Reed | 64/28 |
| 2,748,578 | 6/1956 | Potts | 64/28 |
| 2,964,931 | 12/1960 | Sorenson | 64/28 |
| 3,220,218 | 11/1965 | Rio | 64/28 |
| 3,359,171 | 2/1966 | Hanke | 64/28 |
| 3,516,696 | 6/1970 | Kaim | 287/61 |

FOREIGN PATENT DOCUMENTS 799816  8/1958  United Kingdom .................. 64/28

Primary Examiner—Charles J. Myhre
Assistant Examiner—R. C. Turner
Attorney, Agent, or Firm—Seidel, Gonda, Goldhammer & Panitch

[57] ABSTRACT

A motor drive is connected to an accessory by a splined shaft which in turn is connected to one end of a sleeve. The other end of the sleeve is threaded to a shaft associated with the accessory. The accessory shaft is also connected to the sleeve thereto by a shear pin. When the pin is sheared, the sleeve is rotated relative to the accessory shaft until the splined shaft is disconnected from the motor drive.

10 Claims, 5 Drawing Figures

U.S. Patent  Jan. 22, 1980  4,184,345
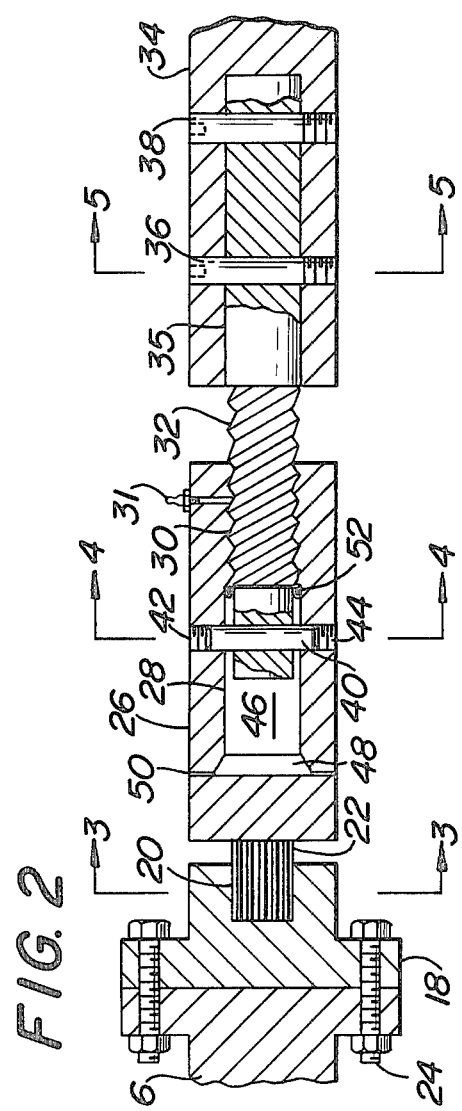
FIG. 5
FIG. 3
FIG. 4
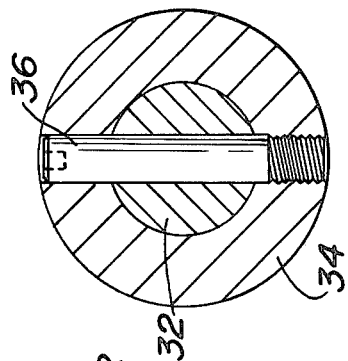
FIG. 1
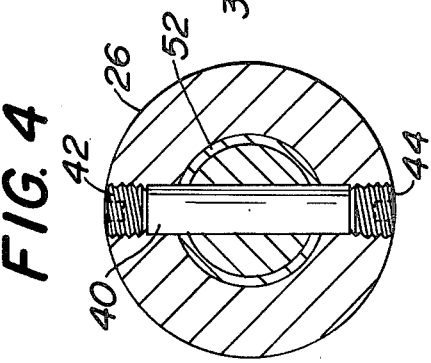
FIG. 2

COUPLING FOR DISCONNECTING A MOTOR DRIVE AND DRIVEN ACCESSORY

BACKGROUND

A motor drive may be a large and expensive piece of equipment such as a turbo-electric motor for a locomotive. An accessory driven by the drive is generally smaller and less expensive. In the event that the accessory locks up so that its shaft is non-rotatable, it is necessary to utilize a coupling which will interrupt the connection between the drive and the accessory. Heretofore, such interruption has been attained by using a coupling having a shear pin whereby the drive and accessory are sill coupled together but in a non-driving relationship. See U.S. Pat. Nos. 1,414,207 and 3,359,171.

Another prior art patent which shows a device for disconnecting a jet engine from one of its accessories is U.S. Pat. No. 3,220,218. The subject matter is this patent is a complex device in which a spring-loaded mechanism is operated to stop the rotation of a nut with a shaft. As a result, the nut moves up the shaft until it engages a flange or shoulder. This in turn results in a fracture of the shaft to effect a disconnection.

The present invention solves the problem of providing a coupling which will completely disconnect the drive for the accessory without fracturing any of the components except for a shear pin and accomplishes the same in a manner which is simple and inexpensive.

SUMMARY OF THE INVENTION

The coupling of the present invention includes an accessory shaft having a threaded portion at one end. The coupling includes a sleeve having a blind bore beginning at one end thereof. The bore is threaded to said accessory shaft. The threads of said bore mate with the threaded portion of said accessory shaft. The length of said threaded portion of said accessory shaft within said bore is shorter than the length of said bore so as to provide an empty chamber at the closed or blind end of said bore.

A frangible shear pin is provided to interconnect said threaded portion of said accessory shaft and said sleeve. A splined shaft is coaxial with and connected to the other end of said sleeve. A motor drive shaft means is provided with a splined bore which receives a portion of said splined shaft. The length of said portion of said splined shaft is less than the axial length of said empty chamber in said sleeve whereby said splined shaft can disconnect from said shaft means by said sleeve rotating relative to said accessory shaft in the event that the accessory shaft is locked.

It is an object of the present invention to provide a coupling for disconnecting a motor drive and a drive assembly in a manner which is simple, inexpensive, and which completely disconnects the motor drive and its accessory after fracture of a shear pin.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is an elevation view of the output end of a drive means and the input end of an accessory interconnected by the coupling of the present invention.

FIG. 2 is a sectional view taken along the line 2—2 in FIG. 1 but on an enlarged scale.

FIG. 3 is a sectional view taken along the line 3—3 in FIG. 2 but on an enlarged scale.

FIG. 4 is a sectional view taken along the line 4—4 in FIG. 2 but on an enlarged scale.

FIG. 5 is a sectional view taken along the line 5—5 in FIG. 2 but on an enlarged scale.

Referring to the drawings in detail, wherein like numerals indicate like elements, there is shown a coupling 10 interconnecting the output end of a drive means 12 and an accessory 14. The drive means 12 may be a turbine, engine or the like and the accessory may be a pump, compressor or the like.

The drive means 12 is provided with an output drive shaft 16 having a radially outwardly directed flange bolted to the flange of an adaptor 18 by way of a plurality of bolts 24. The adaptor 18 has an axially disposed splined bore 20 within which is disposed a portion of a splined shaft 22. See FIGS. 2 and 3.

The exposed portion of the splined shaft 22 is fixedly connected to or integral with one end of a sleeve 26. The other end of sleeve 26 is provided with a blind bore 28. Adjacent the open end of bore 28, there is provided a threaded portion 30. The remainder of bore 28 is unthreaded. The threaded portion 30 mates with the threads on a shaft 32. A lubrication fitting 31 may be provided for introducing lubricant to the threaded connection between sleeve 26 and shaft 32.

Shaft 32 is only partially threaded. The unthreaded portion thereof is disposed within a coaxial bore 35 on the accessory shaft 34. Pins 36 and 38 removably secure the shaft 32 to the shaft 34. As shown more clearly in FIG. 5, the pins 36 have a diameter corresponding to the diameter of shaft 34 and have a threaded portion connected thereto while extending through a transverse hole in the shaft 32. Pins 36 and 38 are connecting pins as opposed to shear pins.

A shear pin 40 extends through a transverse hole in the shaft 32 and extends into aligned tapped holes in the sleeve 28. A set screw 42 is threaded to the sleeve 26 and is aligned with one end of the shear pin 40. A set screw 44 is threaded to the sleeve 26 and is aligned with the opposite end of the shear pin 48. See FIGS. 2 and 4. The set screws retain shear pin 40 in position and permit replacement.

The shaft 32 extends partially into the bore 28 and terminates in a location spaced from the closed or blind end of the bore 28 so as to define an empty chamber 46. The axial length of the chamber 46 is greater than the extent to which shaft 22 extends at the bore 20 and is likewise greater than the distance between the end faces of sleeve 26 and shaft 34. A seal 52 prevents lubricant from entering the chamber 46. Adjacent its blind end, the chamber 46 may be provided with a tapered portion 48 and one or more radially disposed holes 50. Holes 50 are optional but preferred so that any liquids, such as condensate, within chamber 46 will be expelled due to centrifugal force out the holes 50. Further, the holes 50 prevent the compression of air within empty chamber 46 as the shaft 32 moves in an axial direction into the bore 28.

The operation of the present invention is as follows. The drive means 12 drives the accessory 14 by way of the coupling 10. In the event that the accessory shaft 34 of accessory 14 becomes locked up, or otherwise cannot rotate, the coupling 10 of the present invention prevents damaging the accessory 14 and/or the drive means 12.

Damage to the drive means 12 or accessor 14 is prevented as follows. Since sleeve 26 is being driven by shaft 16, adaptor 18, and splined shaft 22, and since shafts 32, 34 are stationary, pin 40 is sheared. Continued rotation of sleeve 26 causes the sleeve 26 to thread along shaft 32 and thereby move to the right in FIG. 2 along with the splined shaft 22. After the sleeve 26 has moved to the right in FIG. 2 for a sufficient distance, shaft 22 will be completely removed from the bore 20. As a result thereof, the drive means 12 is completely disconnected from the coupling 10 with shear pin 48 being the only fractured element. There is no damage to the drive shaft 16 or the adaptor 18. There is no damage to the accessory shaft 34. After the accessory 14 has been repaired so that shaft 34 is again freely rotatable, the sleeve 26 may be backed off the shaft 32 and shaft 22 may be reinserted into bore 20. Thereafter, the fractured shear pin 40 may be replaced with a new shear pin. No welding or machining is needed to recouple the drive means 12 to the accessory 14.

In the embodiment shown in the drawings and described above, there will be a complete disconnection between the drive means 12 and the accessory shaft 34 whereby the accessory 14 may be more easily repaired and/or replaced. In the event that the splined bore 20 becomes damaged, the adaptor 18 is readily replaceable by removing the bolts 24. While shaft 32 is preferably removably connected to the accessory shaft 34, the threads on shaft 32 may be on a reduced diameter portion of the shaft 34 whereby shafts 32 and 34 are one integral shaft. Thus, the present invention provides a disconnectable coupling between a drive means and an accessory driven thereby in a manner which is simple, inexpensive and reliable.

The present invention may be embodied in other specific forms without departing from the spirit or essential attributes thereof and, accordingly, reference should by made to the appended claims, rather than to the foregoing specification, as indicating the scope of the invention.

I claim:

1. A coupling between driving and driven members comprising:
    (a) a first shaft having a threaded portion,
    (b) a sleeve having a blind bore at one end thereof, said bore having threads mating with threads on said first shaft, the length of said first shaft disposed within said bore being less than the length of said bore so as to provide an open chamber at the other end of said bore,
    (c) frangible connecting means for fixedly connecting said sleeve and said first shaft,
    (d) a splined shaft coaxial with and connected to the other end of said sleeve,
    (e) a second shaft having means defining a splined bore receiving a portion of said splined shaft, the length of said portion of said splined shaft within said splined bore being less than the axial length of said chamber whereby said splined shaft can be completely disconnected from said second shaft when the first shaft is stationary, said connecting means fractures and said sleeve rotates relative to said first shaft.

2. A coupling in accordance with claim 1 wherein the length of said first shaft is sufficient to permit greater axial movement of said sleeve than the length of said portion of said splined shaft disposed within said splined bore.

3. A coupling in accordance with claim 1 wherein said frangible connecting means is a shear pin transversely disposed between said first shaft and said sleeve adjacent a free end of said first shaft.

4. A coupling in accordance with claim 1 wherein said first shaft is coaxial with and removably connected to an accessory shaft by transversely disposed pin means.

5. A coupling in accordance with claim 1 wherein said second shaft includes an adaptor bolted to a drive shaft, said adaptor having said splined bore therein on an exposed end face thereof.

6. A coupling in accordance with claim 1 including at least one radially disposed hole in said sleeve and intersecting said bore at the other end of said bore.

7. A coupling in accordance with any previous claim including a drive means and an accessory driven by said drive means, one of said first and second shafts being the output shaft on said drive means while the other is the drive shaft for said accessory.

8. A coupling between driving and driven members comprising:
    (a) a first shaft having a threaded portion, and means for connecting an end of said shaft to an accessory,
    (b) a sleeve having an axial bore, said bore having threads mating with threads on said first shaft, the length of said first shaft disposed within said bore being less than the length of said bore,
    (c) frangible connecting means for fixedly connecting said sleeve and said first shaft,
    (d) a splined shaft coaxial with and connected to the other end of said sleeve.

9. A coupling in accordance with claim 8 including means having a splined bore receiving a portion of said splined shaft, the length of said portion of said splined shaft within said splined bore being less than the axial length of the bore in said sleeve and not occupied by said first shaft whereby said splined shaft can be completely disconnected from said splined bore when the first shaft is stationary, said connecting means fractures and said sleeve rotates relative to said first shaft.

10. A coupling in accordance with claim 9 wherein the length of said first shaft is sufficient to permit greater axial movement than the length of said portion of said splined shaft disposed within said splined bore, said connecting means being a shear pin transversely disposed between said first shaft and said sleeve adjacent a free end of said first shaft.

* * * * *